(12) United States Patent
Line et al.

(10) Patent No.: US 9,809,131 B2
(45) Date of Patent: Nov. 7, 2017

(54) ANTHROPOMORPHIC PIVOTABLE UPPER SEATBACK SUPPORT

(71) Applicant: FORD GLOBAL TECHNOLOGIES, LLC, Dearborn, MI (US)

(72) Inventors: Johnathan Andrew Line, Northville, MI (US); Marcos Silva Kondrad, Macomb Township, MI (US); Daniel Ferretti, Commerce Township, MI (US); Michael Kolich, Windsor (CA); John Wayne Jaranson, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 73 days.

(21) Appl. No.: 14/959,060

(22) Filed: Dec. 4, 2015

(65) Prior Publication Data
US 2017/0158084 A1 Jun. 8, 2017

(51) Int. Cl.
*B60N 2/02* (2006.01)
*B60N 2/22* (2006.01)
*B60N 2/20* (2006.01)

(52) U.S. Cl.
CPC ............ *B60N 2/0232* (2013.01); *B60N 2/20* (2013.01); *B60N 2/2231* (2013.01); *B60N 2/2236* (2013.01); *B60N 2002/0236* (2013.01)

(58) Field of Classification Search
USPC .................................................... 297/354.11
See application file for complete search history.

(56) References Cited

U.S. PATENT DOCUMENTS 2,272,505 A   2/1942   Biggs
2,725,921 A   12/1955  Markin
(Continued)

FOREIGN PATENT DOCUMENTS

DE   102006061226   6/2008
DE   102012006074   11/2012
(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.
(Continued)

*Primary Examiner* — David E Allred
(74) *Attorney, Agent, or Firm* — Vichit Chea; Price Heneveld LLP

(57) ABSTRACT

A vehicle seating assembly a lower seat and a seatback structure extending upwardly relative the lower seat, the lower seat and the seatback structure defining a seat H-point, and the seatback structure having an upper seatback support, a lower seatback support, and a split between the upper seatback support and the lower seatback support. The split is disposed between 270 and 300 mm, preferably about 285 mm, above the H-point along a line extending substantially parallel to the seatback structure. The upper seatback support pivots about a pivot between a rearward position and a forward position relative the lower seatback support. A motorized actuation assembly is disposed within the seatback structure and operably coupled to the upper seatback support, wherein the motorized actuation assembly pivots the upper seatback support about the pivot between the rearward position and the forward position.

18 Claims, 8 Drawing Sheets

(56) References Cited

U.S. PATENT DOCUMENTS

| | | |
|---|---|---|
| 2,958,369 A | 11/1960 | Pitts et al. |
| 3,403,938 A | 10/1968 | Cramer et al. |
| 3,880,462 A | 4/1975 | Mednick |
| 3,929,374 A | 12/1975 | Hogan et al. |
| 4,058,342 A | 11/1977 | Ettridge |
| 4,205,877 A | 6/1980 | Ettridge |
| 4,324,431 A | 4/1982 | Murphy et al. |
| 4,334,709 A | 6/1982 | Akiyama et al. |
| 4,353,595 A | 10/1982 | Kaneko et al. |
| 4,518,201 A | 5/1985 | Wahlmann et al. |
| 4,541,669 A | 9/1985 | Goldner |
| 4,609,221 A | 9/1986 | Bottcher |
| 4,616,874 A | 10/1986 | Pietsch et al. |
| 4,629,248 A | 12/1986 | Mawbey |
| 4,720,141 A | 1/1988 | Sakamoto et al. |
| 4,915,447 A | 4/1990 | Shovar |
| 5,104,189 A | 4/1992 | Hanai et al. |
| 5,112,018 A | 5/1992 | Wahls |
| 5,120,109 A * | 6/1992 | Rangoni .............. B60N 2/1803 297/284.3 |
| 5,145,232 A | 9/1992 | Dal Monte |
| 5,171,062 A | 12/1992 | Courtois |
| 5,174,526 A | 12/1992 | Kanigowski |
| 5,203,608 A | 4/1993 | Tame |
| 5,370,443 A | 12/1994 | Maruyama |
| 5,518,294 A | 5/1996 | Ligon, Sr. et al. |
| 5,560,681 A | 10/1996 | Dixon et al. |
| 5,647,635 A | 7/1997 | Aumond et al. |
| 5,658,050 A | 8/1997 | Lorbiecki |
| 5,692,802 A | 12/1997 | Aufrere et al. |
| 5,755,493 A | 5/1998 | Kodaverdian |
| 5,758,924 A | 6/1998 | Vishey |
| 5,769,489 A | 6/1998 | Dellanno |
| 5,823,620 A | 10/1998 | Le Caz |
| 5,826,938 A | 10/1998 | Yanase et al. |
| 5,836,648 A | 11/1998 | Karschin et al. |
| 5,868,450 A | 2/1999 | Hashimoto |
| 5,902,014 A | 5/1999 | Dinkel et al. |
| 5,913,568 A | 6/1999 | Brightbill et al. |
| 5,951,039 A | 9/1999 | Severinski et al. |
| 5,979,985 A | 11/1999 | Bauer et al. |
| 6,024,406 A | 2/2000 | Charras et al. |
| 6,062,642 A | 5/2000 | Sinnhuber et al. |
| 6,079,781 A | 6/2000 | Tilley |
| 6,109,690 A | 8/2000 | Wu et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,530,622 B1 * | 3/2003 | Ekern .................. B60N 2/2222 297/284.1 |
| 6,550,856 B1 | 4/2003 | Ganser et al. |
| 6,565,150 B2 | 5/2003 | Fischer et al. |
| 6,619,605 B2 | 9/2003 | Lambert |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,938,953 B2 | 9/2005 | Haland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,100,992 B2 | 9/2006 | Bargheer et al. |
| 7,131,694 B1 | 11/2006 | Buffa |
| 7,140,682 B2 | 11/2006 | Jaeger et al. |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,216,915 B2 | 5/2007 | Kammerer et al. |
| 7,229,118 B2 | 6/2007 | Saberan et al. |
| 7,261,371 B2 | 8/2007 | Thunissen et al. |
| 7,344,189 B2 | 3/2008 | Reed et al. |
| 7,350,859 B2 | 4/2008 | Klukowski |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,481,489 B2 | 1/2009 | Demick |
| 7,506,924 B2 | 3/2009 | Bargheer et al. |
| 7,506,938 B2 | 3/2009 | Brennan et al. |
| 7,523,888 B2 | 4/2009 | Ferry et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,578,554 B2 | 8/2009 | Lee et al. |
| 7,597,398 B2 | 10/2009 | Lindsay |
| 7,614,693 B2 | 11/2009 | Ito |
| 7,641,281 B2 | 1/2010 | Grimm |
| 7,669,925 B2 | 3/2010 | Beck et al. |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,602 B2 | 8/2010 | Lazanja et al. |
| 7,784,863 B2 | 8/2010 | Fallen |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Ito et al. |
| 7,946,649 B2 | 5/2011 | Galbreath et al. |
| 7,963,553 B2 | 6/2011 | Huynh et al. |
| 7,963,595 B2 | 6/2011 | Io et al. |
| 7,963,600 B2 | 6/2011 | Alexander et al. |
| 7,966,835 B2 | 6/2011 | Petrovski |
| 7,967,379 B2 | 6/2011 | Walters et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,042,415 B2 * | 10/2011 | Ito .................. B60N 2/0232 297/408 |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |
| 8,210,568 B2 | 7/2012 | Ryden et al. |

(56) References Cited

U.S. PATENT DOCUMENTS

| | | |
|---|---|---|
| 8,210,605 B2 | 7/2012 | Hough et al. |
| 8,210,611 B2 | 7/2012 | Aldrich et al. |
| 8,226,165 B2 | 7/2012 | Mizoi |
| 8,262,164 B2* | 9/2012 | Ito ........................ B60N 2/0232 297/354.1 |
| 8,297,708 B2 | 10/2012 | Mizobata et al. |
| 8,342,607 B2 | 1/2013 | Hofmann et al. |
| 8,408,646 B2 | 4/2013 | Harper et al. |
| 8,516,842 B2 | 8/2013 | Petrovski |
| 9,126,508 B2 | 9/2015 | Line et al. |
| 2004/0195870 A1 | 10/2004 | Bohlender et al. |
| 2005/0200166 A1 | 9/2005 | Noh |
| 2006/0043777 A1 | 3/2006 | Friedman et al. |
| 2007/0120401 A1 | 5/2007 | Minuth et al. |
| 2007/0200398 A1 | 8/2007 | Wolas et al. |
| 2008/0174159 A1 | 7/2008 | Kojima et al. |
| 2009/0066122 A1 | 3/2009 | Minuth et al. |
| 2009/0165263 A1 | 7/2009 | Smith |
| 2009/0322124 A1 | 12/2009 | Barkow et al. |
| 2010/0026066 A1 | 2/2010 | Graber et al. |
| 2010/0038937 A1 | 2/2010 | Andersson et al. |
| 2010/0140986 A1 | 6/2010 | Sawada |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0259081 A1 | 10/2010 | Kuno |
| 2010/0270840 A1 | 10/2010 | Tanaka et al. |
| 2010/0301650 A1 | 12/2010 | Hong |
| 2010/0320816 A1 | 12/2010 | Michalek |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109128 A1 | 5/2011 | Axakov et al. |
| 2011/0109217 A1 | 5/2011 | Park et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2013/0285426 A1 | 10/2013 | Arant et al. |
| 2014/0203606 A1 | 7/2014 | Line et al. |
| 2014/0203610 A1 | 7/2014 | Line et al. |
| 2014/0203617 A1 | 7/2014 | Line et al. |
| 2015/0165935 A1 | 6/2015 | Sachs et al. |
| 2016/0075260 A1* | 3/2016 | Atger ....................... B60N 2/22 297/354.12 |
| 2016/0096448 A1* | 4/2016 | Line .................... B60N 2/2222 297/354.11 |

FOREIGN PATENT DOCUMENTS

| | | |
|---|---|---|
| EP | 627339 | 12/1994 |
| EP | 0670240 | 2/1995 |
| EP | 754590 | 1/1997 |
| EP | 0594526 B1 | 3/1997 |
| EP | 926969 | 1/2002 |
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| EP | 2565070 | 3/2013 |
| JP | 2008189176 | 8/2008 |
| JP | 201178557 | 4/2011 |
| JP | 2011098588 | 5/2011 |
| JP | 2011251573 | 12/2011 |
| KR | 1020080066428 | 7/2008 |
| KR | 1020110051692 | 5/2011 |
| KR | 101180702 | 9/2012 |
| WO | 9511818 | 5/1995 |
| WO | 9958022 | 11/1999 |
| WO | 2006131189 | 12/2006 |
| WO | 2007028015 | 8/2007 |
| WO | 2008019981 | 2/2008 |
| WO | 2008073285 | 6/2008 |
| WO | 2010096307 | 8/2010 |
| WO | 2011021952 | 2/2011 |
| WO | 2012008904 | 1/2012 |

OTHER PUBLICATIONS

"Thigh Support for Tall Drivers" http://cars.about.com/od/infiniti/ig/2009-Inifiniti-G37-Coupe-pics/2008-G37-cpe-thigh-support.htm (1 page).

Mladenov, "Opel Insignia Receives Seal of Approval for Ergonomic Seats," published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

ecoustics.com, "Cineak Motorized Articulating Headrest Preview," http://www.ecoustics.com/ah/reviews/furniture/accessories/cineak-motorized-headres, Oct. 9, 2012 (3 pages).

"'Performance' Car Seat Eliminates Steel," published in Plastics News—Indian Edition Plastics & Polymer News, http://www.plasticsinformart.com/performance-car-seat-eliminates-steel/ Jan. 2012 (3 pages).

"Frankfurt 2009 Trend—Light and Layered," by Hannah Macmurray, published in GreeenCarDesign, http://www.greencarddesign.com/site/trends/00138-frankfurt-2009-trend-light-and-layered, Sep. 2009 (9 pages).

General Motors LLC, "2013 Chevrolet Spark Owner Manual," copyright 2012, 356 pages.

"Imola Pro-Fit," Cobra (http://cobra.subseports.com/products/cat/seats/brand/Cobra/prodID/656), date unknown, 2 pages.

* cited by examiner

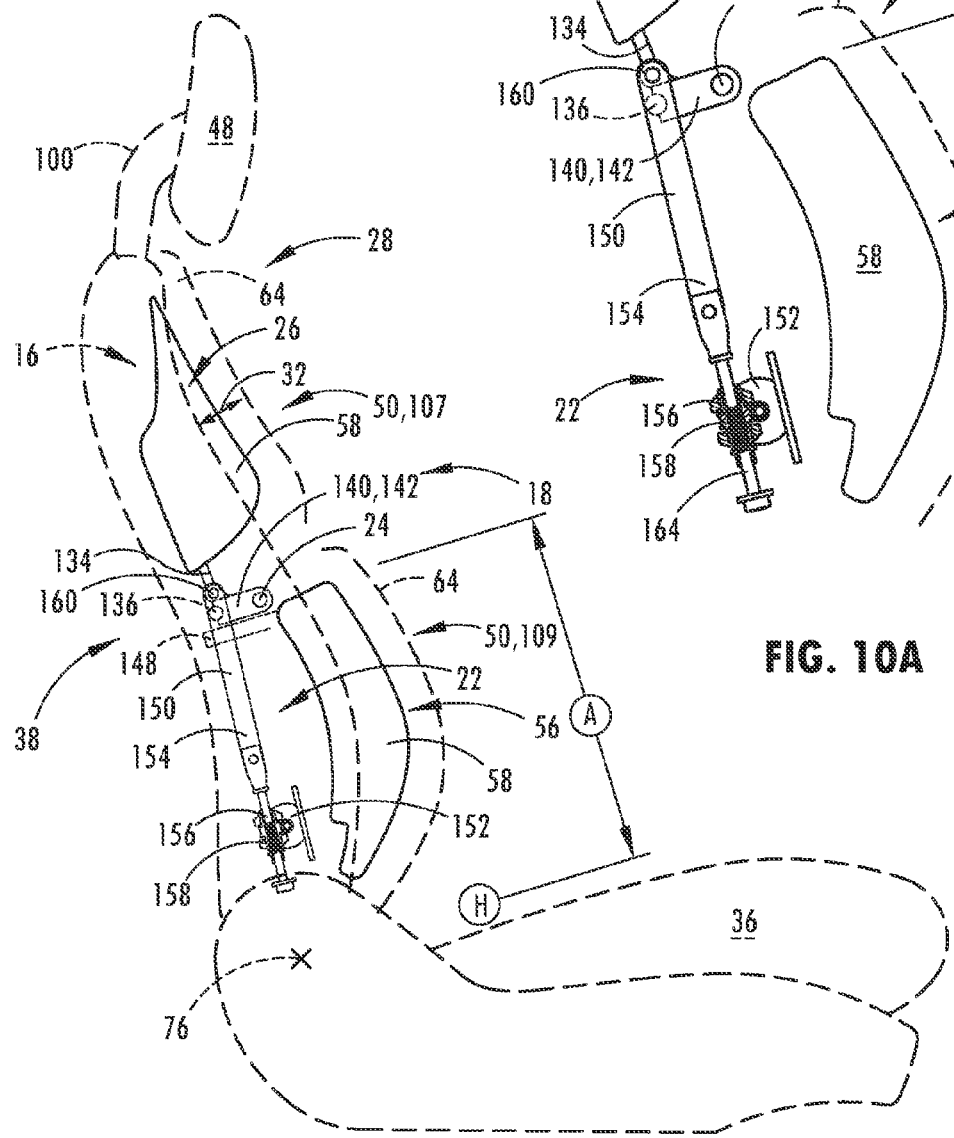
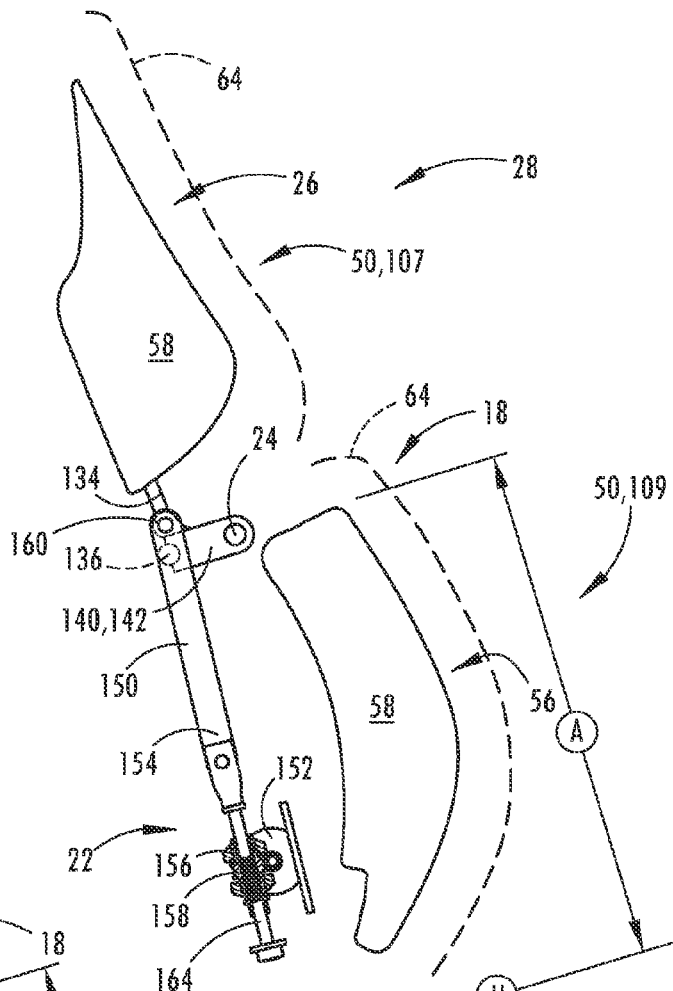
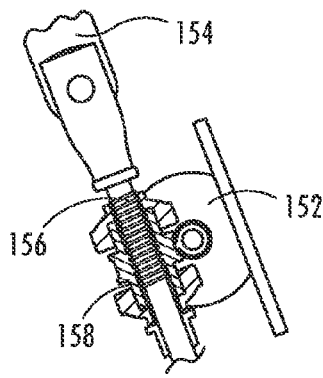
FIG. 10B
FIG. 10A
FIG. 10

ANTHROPOMORPHIC PIVOTABLE UPPER SEATBACK SUPPORT

FIELD OF THE INVENTION

The present invention generally relates to a seatback for a vehicle seating assembly, and more particularly to a seatback having an anthropomorphic pivotable upper seatback support.

BACKGROUND OF THE INVENTION

Seating assemblies for vehicles typically include a seatback to support the back of an occupant in an upright seated position and various reclined positions. Seatbacks of these vehicle seating assemblies are commonly designed to support an occupant upon acceleration, change in direction, and collision of the vehicle, such that the seatbacks are substantially rigid in construction and lack adequate adjustment features, particularly in meeting the needs of varying occupant body shapes, sizes, and relaxation positions.

SUMMARY OF THE INVENTION

According to one aspect of the present invention, a vehicle seating assembly includes a lower seat support and a seatback structure extending upwardly relative the lower seat support, the lower seat support and the seatback structure defining a seat H-point, and the seatback structure having an upper seatback support, a lower seatback support, and a split between the upper seatback support and the lower seatback support, wherein the split is disposed between 270 and 300 mm (preferably about 185 mm) above the H-point along a line extending substantially parallel to the seatback structure. A pivot is rotatably supported on the seatback structure proximate the split and rotatably coupled to the upper seatback support, whereby the upper seatback support pivots about the pivot between a rearward position and a forward position relative the lower seatback support. A motorized actuation assembly is disposed within the seatback structure and is operably coupled to the upper seatback support, wherein the motorized actuation assembly pivots the upper seatback support about the pivot between the rearward position and the forward position.

According to another aspect of the present invention, a vehicle seating assembly comprises a seat and a seatback defining an H-point, an upper seatback support coupled with the seatback having a lower edge disposed between 270 and 300 mm (preferably about 185 mm) above the H-point along a line extending substantially parallel to the seatback, wherein the upper seatback support pivots between a rearward position and a forward position relative the seatback, and a motorized actuation assembly is coupled with and controls the position of the upper seatback support.

According to yet another aspect of the present invention, a vehicle seatback assembly includes a dynamic upper suspension assembly operably coupled to an actuation assembly to rotate forward, a static lower suspension assembly coupled to a seatback structure integral with the seatback assembly, and a split between the dynamic upper suspension assembly and the static lower seatback suspension assembly, wherein the split is disposed between 270 and 300 mm (preferably about 185 mm) above an H-point along a line extending substantially parallel to the seatback assembly.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 10 is a side elevational view of the upper seatback pivot system in a rearward position, and the vehicle seating assembly in dashed lines, having the seatback assembly in an upright position;

FIG. 10A is a side elevational view of the upper seatback support, the lower seatback support, and the motorized actuation assembly in the rearward position, showing the support surface of the seatback assembly in dashed lines;

FIG. 10B is an enlarged side elevational view of a motor and worm device of the motorized actuation assembly;

DETAILED DESCRIPTION OF THE EMBODIMENTS

Figure 1:
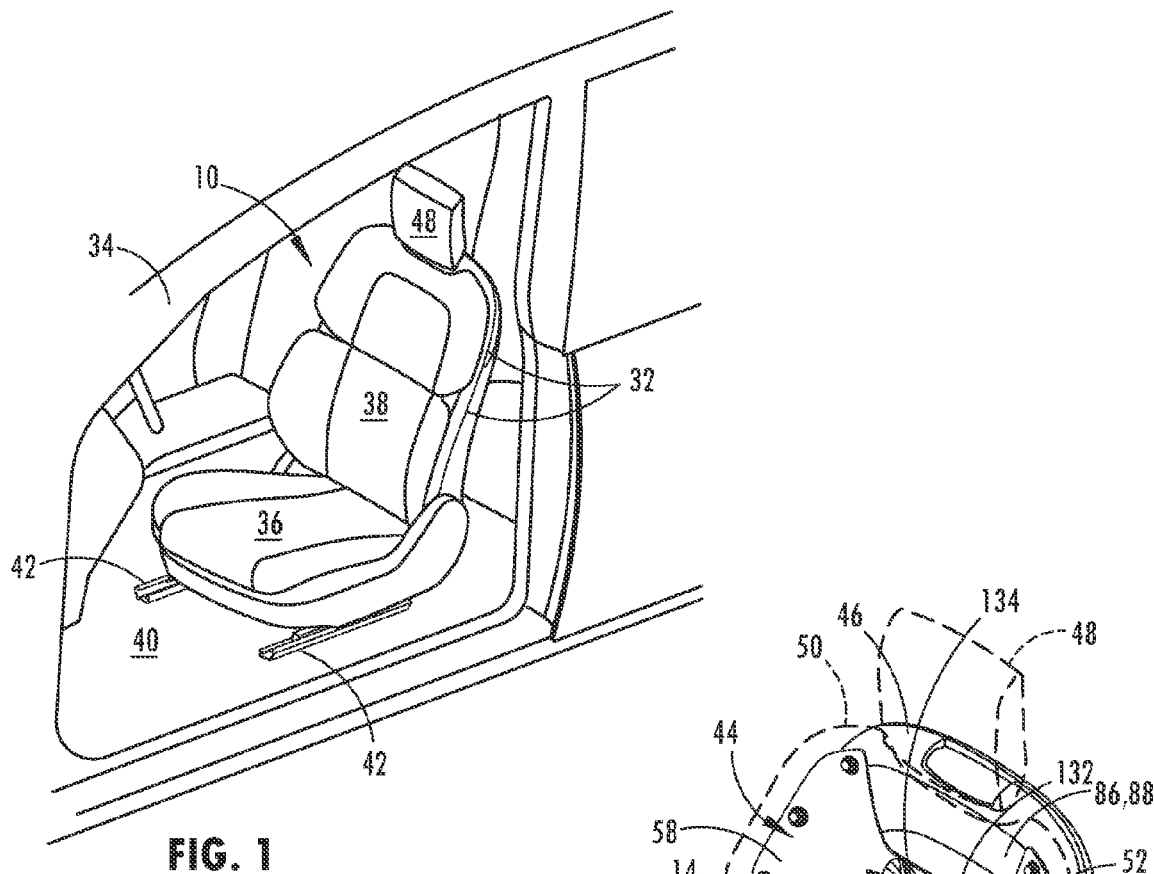
FIG. 1 is a top perspective view of a vehicle seating assembly in a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-12A, reference numeral 10 generally designates a vehicle seating assembly that includes a first side support 12 and a second side support 14 defining a seatback structure 16 that is operable between an upright position and a reclined position. A motorized actuation assembly 22 is disposed between the first and second side supports 12, 14 and is operably coupled to a pivot bar 24 that is rotatably coupled with the seatback structure 16. An upper seatback support 26 is coupled to the pivot bar 24. The upper seatback support 26 pivots relative to the pivot bar 24 to a rearward position 28 and pivots relative to the pivot bar 24 to a forward position 30 when actuated by the occupant while the seatback structure 16 is in either the upright position or the reclined position. An external peripheral gap 32 is defined between the upper seatback support 26 and the seatback structure 16.

Referring now to FIG. 1, the vehicle seating assembly 10 is positioned in a driver side location of a vehicle 34. The vehicle seating assembly 10 includes a seatback assembly 38 pivotally coupled with a seat 36. The seat 36 is slidably coupled with a floor 40 of the vehicle 34 about a track assembly 42. The track assembly 42 is configured to allow the vehicle seating assembly 10 to be adjusted in forward and rearward directions relative to the vehicle 34. It is understood that the vehicle seating assembly 10 may be positioned in various locations throughout the vehicle 34 other than the illustrated position, such as a passenger side location, a mid-row location, and a rear seat location. It is also conceivable that the seat 36 may not include the track assembly 42 and alternatively may be fixedly coupled with the floor 40 of the vehicle 34.

Figure 2:
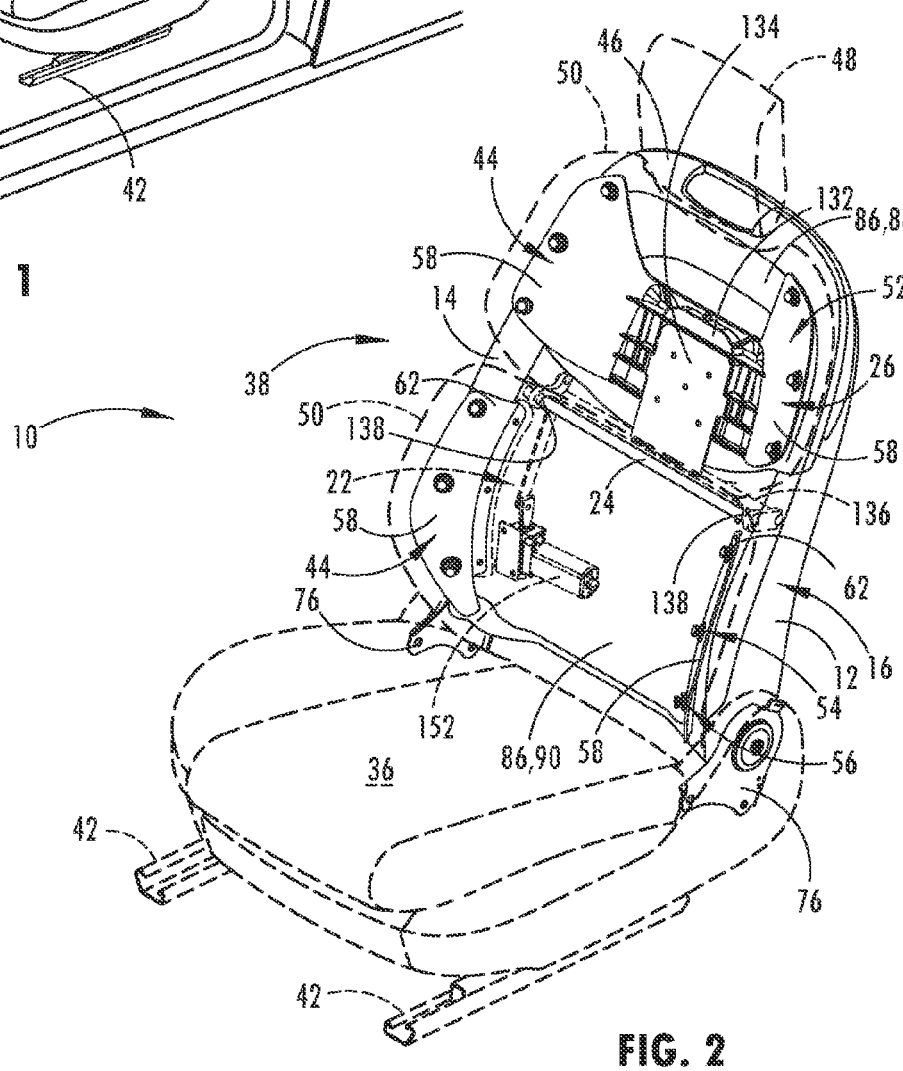
FIG. 2 is a top perspective view of the vehicle seating assembly having a motorized actuation assembly.

As illustrated in FIG. 2, the seatback assembly 38 includes the seatback structure 16 having the first and second side supports 12, 14 pivotally coupling with a rear portion of the seat 36. The first and second side supports 12, 14 extend upward and away from the seat 36 to couple with a top support 46 extending orthogonally therebetween. A headrest 48 is coupled with and supported by the top support 46, located centrally between the first and second side supports 12, 14. A seatback suspension system 44 is disposed between the first and second side supports 12, 14 and extends forward from the seatback structure 16 to engage a passenger support 50. The seatback suspension system 44 includes a dynamic upper suspension assembly 52 and a static lower suspension assembly 54. The static lower suspension assembly 54 includes a lower seatback support 56 operably coupled to the seatback structure 16. The lower seatback support 56 maintains alignment with the seatback structure 16 as the seatback assembly 38 pivots relative to the seat 36. The dynamic upper suspension assembly 52, likewise, includes the upper seatback support 26 coupled to the pivot bar 24 extending between the first and second side supports 12, 14. It is contemplated that the headrest 48 may be integrated with the top support 46 of the seatback structure 16 or that the headrest 48 may otherwise not be included on the vehicle seating assembly 10. It is also conceivable that the headrest 48 may be integrated with the passenger support 50 and the upper seatback support 26. The seatback structure 16 may also be positioned in a reclined position.

Figure 3:
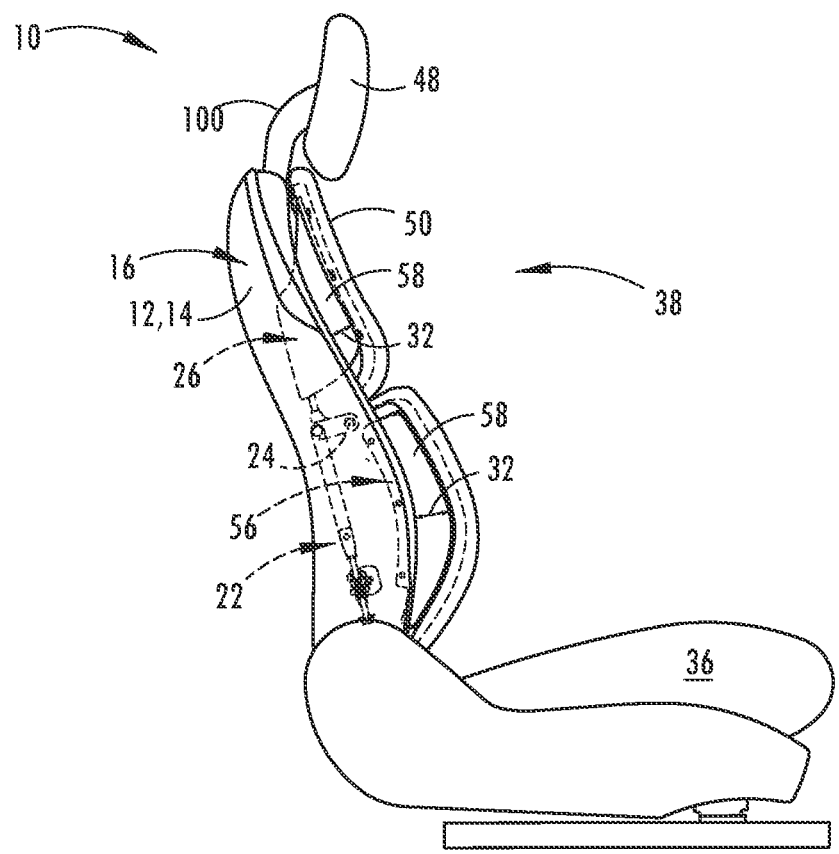
FIG. 3 is a side elevational view of the vehicle seating assembly shown in FIG. 2.

As illustrated in FIG. 3, the upper and lower seatback supports 26, 56 include flex members 58 that extend forward from the seatback structure 16 to define the external peripheral gap 32 between the seatback structure 16 and the passenger support 50. The external peripheral gap 32 may be reduced in size proximate a rearward force acting on the passenger support 50 that compresses one or more of the flex members 58 supporting the passenger support 50. As such, the upper seatback support 26 and the lower seatback support 56 are independently flexible under the weight of an occupant, as described in more detail below. As also shown in FIG. 3, the motorized actuation assembly 22 operably coupled with and controlling the position of the pivot bar 24 when activated is disposed within the seatback structure 16 between the first and second side supports 12, 14 and rearward the lower seatback support 56. Accordingly, the motorized actuation assembly 22 is contained within and concealed by the seatback structure 16. However, it is conceivable that portions of the motorized actuation assembly 22 may be exposed and/or alternatively located above or beneath the lower seatback support 56.

Figure 4:
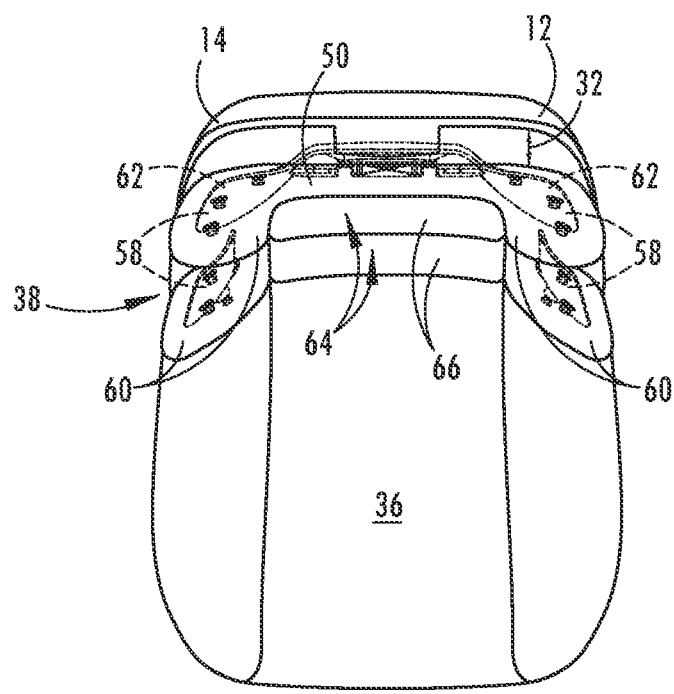
FIG. 4 is a top plan view of the vehicle seating assembly shown in FIG. 2.

As shown in FIG. 4, the flex members 58 of the upper and lower seatback supports 26, 56 extend forward and laterally outward to operably couple with angled side bolsters 60 of the passenger support 50. The angled side bolsters 60 are integrated with a shape of the passenger support 50 and are configured to prevent lateral movement of a passenger's back relative to the passenger support 50, such as lateral movement of an occupant caused by turning the vehicle 34 in motion. As illustrated, the passenger support 50 spans between distal ends 62 of the flex members 58 on the upper and lower seatback supports 26, 56 to define a back support surface 64. More specifically, the passenger support 50 includes a central support 66 extending between the angled side bolsters 60 to provide the back support surface 64 with continuous coverage and support for a passenger's back. It is contemplated that the passenger support 50 may include alternative shapes or orientations operably coupled with the seatback suspension system 44.

Figure 5:
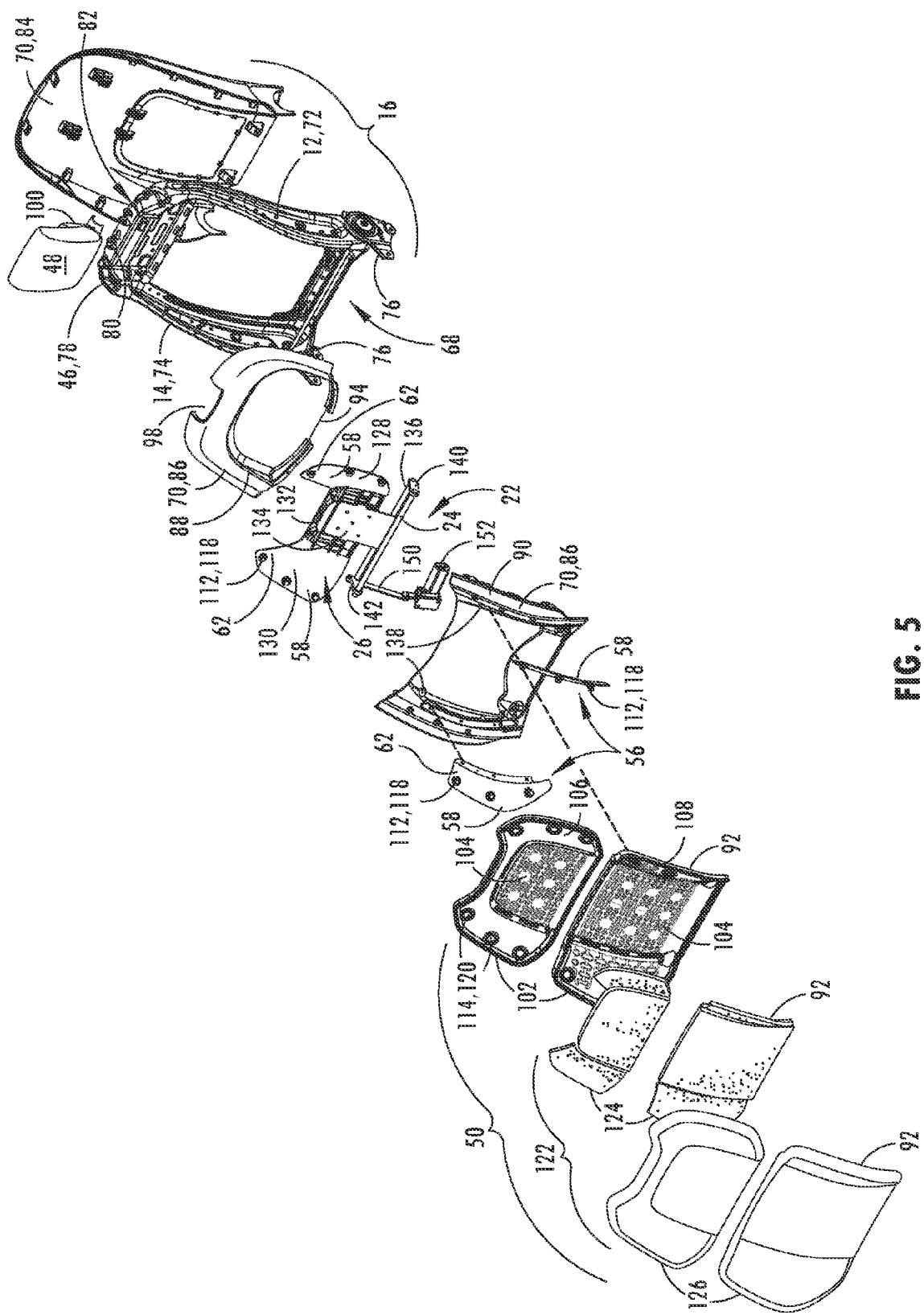
FIG. 5 is an exploded top perspective view of a seatback assembly of the vehicle seating assembly shown in FIG. 2.

Referring now to the embodiment illustrated in FIG. 5, the seatback structure 16 includes a metal frame 68 and a trim shroud 70 (preferably constructed with a plastic material) configured to substantially enclose the metal frame 68. The metal frame 68 has a first side member 72 and a second side member 74 extending upward from a pivotal connection with recliner brackets 76 that couples with the seat 36 (FIG. 2). The first and second side members 72, 74 are substantially parallel with each other and curve upward and rearward from the recliner brackets 76 to provide a curved shape that is substantially similar to an occupant's spinal column. Further, the first and second side members 72, 74 are more robust proximate the recliner brackets 76 and taper as they extend upward to couple with a top member 78 that extends orthogonally between the first and second side members 72, 74. Accordingly, the first and second side supports 12, 14 of the seatback structure 16 include the first and second side members 72, 74, respectively, and the top support 46 of the seatback structure 16 includes a top member 78 of the metal frame 68. The top member 78 includes connection features 80 for securing the headrest 48 at a central portion 82 of the top member 78, centrally between the first and second side members 72, 74. Again, it is conceivable that the headrest 48 may alternatively be attached or integrated with the metal frame 68 or other portions of the seatback structure 16.

As also shown in FIG. 5, the trim shroud 70 includes a rear trim panel 84 and a front trim panel 86. The rear trim panel 84 couples with the metal frame 68 to substantially enclose a rear portion of the seatback structure 16. The front trim panel 86 has an upper piece 88 and a lower piece 90 that each couple with the metal frame 68 to enclose a front portion of the seatback structure 16. The lower piece 90 of the front trim panel 86 couples with the metal frame 68, allowing two flex members 58 to couple with the sides of the lower piece 90 proximate the first and second side members 72, 74 of the metal frame 68. As such, the lower piece 90 of the front trim panel 86 is coupled between the metal frame 68 and the flex members 58 of the lower seatback support 56. The flex members 58 on the lower piece 90 support a lower segment 92 of the passenger support 50. The upper piece 88 of the front trim panel 86 similarly couples with the metal frame 68 proximate the top member 78 and the first and second side members 72, 74. In addition, the upper piece 88 engages the lower piece 90 of the front trim panel 86 at an intermediate area of the seatback structure 16. The upper piece 88 includes a lower cutaway 94 proximate the intermediate area for receiving the upper seatback support 26 that extends through the lower cutaway 94 to couple with the pivot bar 24. The upper piece 88 also includes a mounting cutaway 98 proximate the central portion 82 of the top member 78 for receiving a support post 100 of the headrest 48 that extends through the mounting cutaway 98 to couple with the connection features 80 on the metal frame 68. The trim shroud 70 is typically molded with polymer material, and the metal frame 68 is typically constructed of a rigid metal such as steel, aluminum, or other substantially rigid metals. It is conceivable that alternative materials or forming methods may be used for the trim shroud 70 and the metal frame 68. In addition, the trim shroud 70 or portions thereof may conceivably be integrated with the metal frame 68 or portions thereof to form the seatback structure 16.

The passenger support 50, as illustrated in FIG. 5, removably couples with the distal ends 62 of the flex members 58. The passenger support 50 includes a trim carrier 102 having an open matrix 104 that defines a pattern of resilient elements configured to support the weight of a passenger. The trim carrier 102 has an upper panel 106 and a lower panel 108 that respectively operably couple with the upper seatback support 26 and the lower seatback support 56 in a friction-fit connection. The friction-fit connection is formed between a quick attachment feature 112 on the distal ends 62 of the flex members 58 and an engagement element 114 on an edge portion of the trim carrier 102. The quick attachment feature 112 includes a protrusion 118 that is configured to be inserted in a keyhole slot 120 of the engagement element 114. The passenger support 50 also includes a cushion 122 disposed over a forward facing surface of the trim carrier 102. The cushion 122 includes a flexible portion 124 and a cover stock portion 126 that is disposed over the flexible portion 124. The flexible portion 124 may conceivably include a resilient structure of woven fibers that have open areas to allow ventilation, an open cell foam, a closed cell foam, or other conceivable flexible and breathable materials. The cover stock portion 126 provides additional support to hold the flexible portion 124 against the trim carrier 102 of the passenger support 50. The cover stock portion 126 may conceivably include a fabric material, a leather material, a vinyl material, or other conceivable seating upholstery materials.

Figure 6:
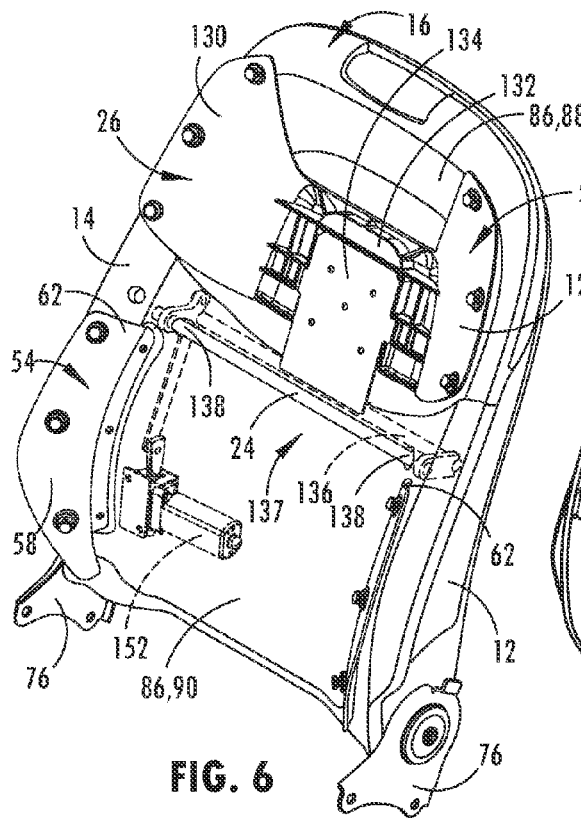
FIG. 6 is a front, top perspective view of the seatback assembly, showing internal components of the seatback assembly in dashed lines.

Referring now to FIG. 6, the upper seatback support 26 of the dynamic upper suspension assembly 52 is located forward and proximate the upper piece 88 of the front trim panel 86. The upper seatback support 26 preferably includes a first flex member 128, a second flex member 130, and a central body 132 disposed there between. The central body 132 of the upper seatback support 26 is coupled with an extension bracket 134 that operably couples with a support bar 136 of the upper suspension assembly 52. The extension bracket 134 extends through the lower cutaway 94 (FIG. 5) in the upper piece 88 of the front trim panel 86, between the upper piece 88 and the lower piece 90 of the front trim panel 86. The support bar 136 extends between the first and second side supports 12, 14 of the seatback structure 16, in parallel alignment with and rearward the pivot bar 24. The support bar 136 couples with the pivot bar 24 at the distal ends 62 thereof. Accordingly, the support bar 136 extends entirely rearward the front trim panel 86 and the pivot bar 24 extends partially forward the front trim panel 86. More specifically, the pivot bar 24 extends laterally across the intermediate portion 137 of the front trim panel 86 and through rotation apertures 138 in the front trim panel 86 proximate the first and second side members 72, 74, allowing the distal ends 62 of the pivot bar 24 to reside rearward the front trim panel 86. It is contemplated that the extension bracket 134 may couple directly with the pivot bar 24 potentially eliminating the lower cutaway 94 and the support bar 136. It is also conceivable that the pivot bar 24 and the support bar 136 may alternatively be shaped or arranged to provide a lateral axis to rotate the upper seatback support 26 forward about the lateral axis.

Figure 7:
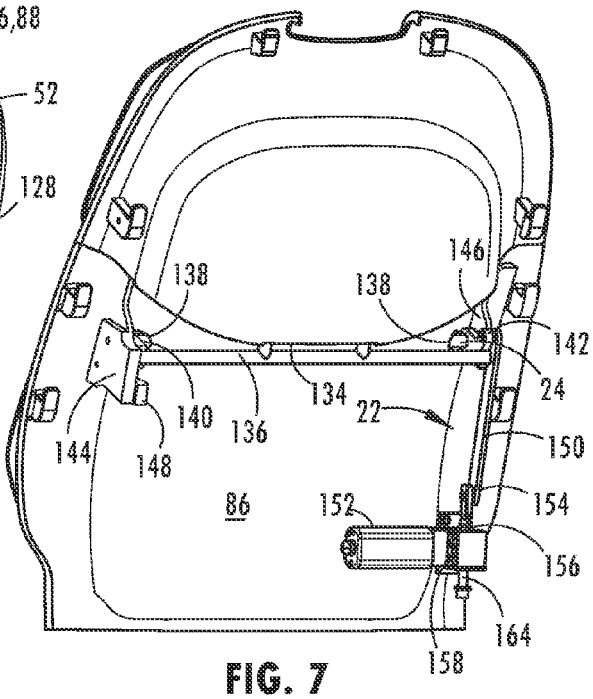
FIG. 7 is a rear, top perspective view of the seatback assembly having a metal frame and a rear trim panel of the seatback assembly removed.

As shown in FIG. 7, the distal ends 62 of the pivot bar 24 couple with a first cam 140 and a second cam 142 that each extend rearward to couple with the support bar 136. The first and second cams 140, 142 reside rearward the front trim panel 86 between the first and second side supports 12, 14. The first and second cams 140, 142 pivotally couple respectively with a first support bracket 144 and a second support bracket 146 protruding rearward from the front trim panel 86 proximate the distal ends 62 of the pivot bar 24. The first support bracket 144 includes a stop 148 positioned to abut the first cam 140 when the upper seatback support 26 is in the rearward position 28, as described in more detail below. The motorized actuation assembly 22 includes a lift bar 150 that extends down from the rearward portion of the second cam 142, proximate the support bar 136, to operably couple with a motor 152 of the motorized actuation assembly 22. More specifically, the lift bar 150 extends down from the second cam 142 in general alignment with the flex members 58 of the static lower suspension assembly 54 (FIG. 6) to operably couple with the motor 152. A lower end 154 of the lift bar 150 pivotally couples with a worm drive 156 that interfaces with a worm gear 158 operably coupled with the motor 152. The motor 152 is coupled with the lower portion of the front trim panel 86, proximate the second side support 14 of the seatback structure 16 (FIG. 6). However, it is conceivable that the motor 152 may be coupled with the metal frame 68 or other portions of the seatback structure 16. It is also contemplated that the support brackets 144, 146 may be integrated with the metal frame 68 or otherwise alternatively constructed to support the pivot bar 24.

Figure 8:
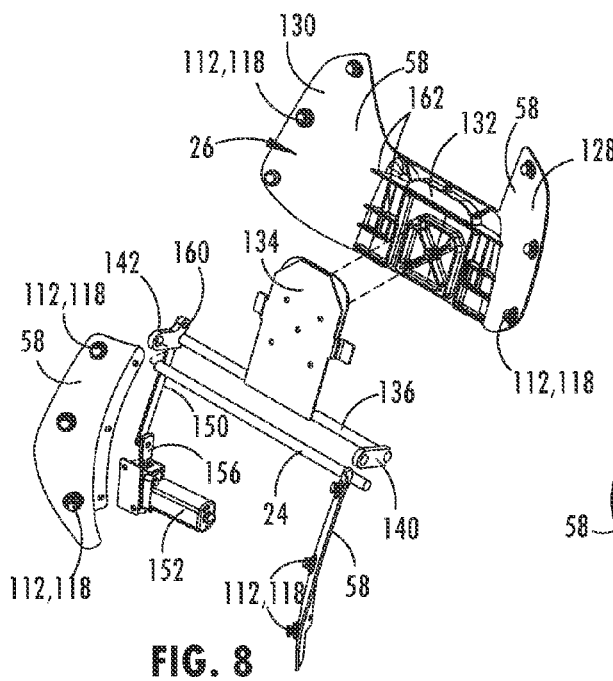
FIG. 8 is an exploded front, top perspective view of an upper seatback support, a lower seatback support, and a motorized actuation assembly.
Figure 9:
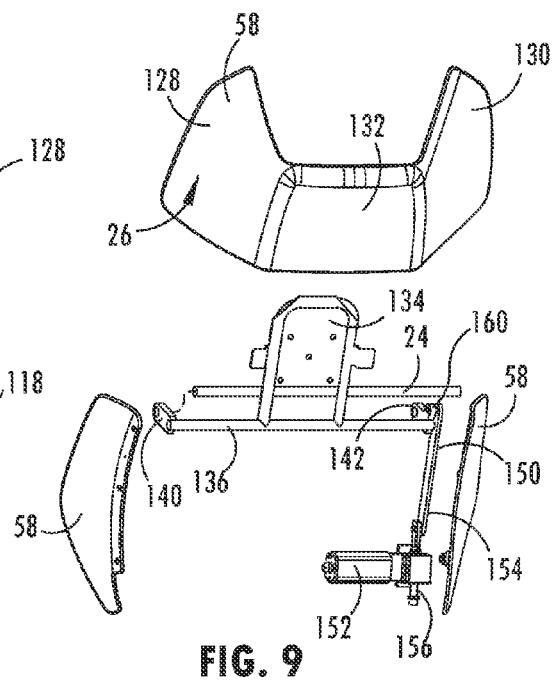
FIG. 9 is an exploded rear, top perspective view of the upper seatback support, the lower seatback support, and the motorized actuation assembly.

As shown in FIGS. 8-9, the lift bar 150 pivotally couples with an eyelet portion 160 of the second cam 142 that protrudes upward proximate the connection of the support bar 136 with the second cam 142. The support bar 136 is fixedly coupled to the first and second cams 140, 142 and to the extension bracket 134 coupled centrally there between.

As such, the support bar 136 is configured to rotate about the pivot bar 24 to move the extension bracket 134 forward and rearward. The extension bracket 134 protrudes upward from the support bar 136 to couple with the central body 132 of the upper seatback support 26. The central body 132 is substantially rectangular shaped and includes structural flanges 162 between the extension bracket 134 and the flex members 58 to provide structural support to the central body 132. The structural flanges 162 and other portions of the central body 132 are substantially rigid relative to the flex members 58, such that rearward force applied to the upper seatback support 26 causes the flex members 58 to elastically bend rearward.

As illustrated in FIG. 10, the upper seatback support 26 is in the rearward position 28 further defined by the back support surface 64 of an upper segment 107 of the passenger support 50 being in general alignment with the back support surface 64 of a lower segment 109 of the passenger support 50, providing a curvature substantially similar to the curvature of the seatback structure 16. Also, in the rearward position 28, the stop 148 on the first support bracket 144 (FIG. 7) is in abutting contact with the first cam 140, preventing further rearward displacement of the upper seatback support 26. The first and second cams 140, 142 are generally orthogonal to the lift bar 150 in the rearward position 28. As also illustrated in FIG. 10, the seatback assembly 38 is in the upright position relative to the seat 36. Generally, the upright position is configured for a passenger to be seated in an upright seated orientation.

The worm drive 156, as shown in FIGS. 10A-10B, extends through the motor 152 and has a bottom portion suspended beneath the motor 152. The worm drive 156 interfaces with the worm gear 158 attached to the drive shaft of the motor 152. It is conceivable that the worm gear 158 has a helical pattern or other gear pattern to interface with the worm drive 156 and to drive the worm drive 156, causing lateral displacement of the worm drive 156 relative to the motor 152. The worm gear 158 also prevents the worm drive 156 from displacing upward or downward relative to the motor 152 without rotational actuation of the motor 152. The motor 152 is an electrical motor electrically coupled with a power source in the vehicle 34 (FIG. 1). However, it is also conceivable that the motor 152 may include a manual rotation device, such as a crank, to manually displace the worm drive 156 upward and downward. The motor 152 may also conceivably be directly coupled with the pivot bar 24 or operably coupled to the pivot bar 24 with an alternative gearing and/or linkage configuration.

As shown in FIGS. 10-13A, the pivot bar 24, which functionally defines the split between a lower edge 170 of the upper seatback support 26 and an upper edge 172 of the lower back support 56 (shown in FIGS. 11A and 13A), is located at a fixed predetermined height A above the seat H-point designated as H along the torso line axis at the center of the seat to provide enhanced upper back support and comfort that mimics a typical transition of the spine of a human occupant from its lower lumbar area to the upper back from the shoulder blades to the shoulders. The inventors of the present disclosure have determined that the height A should be between 270 and 300 mm, and preferably 285 mm, above the seat H-point along the torso line axis at the center of the seat, which is substantially parallel with the seatback structure 16. The split between the upper seatback support 26 and the lower back support 56 at such a height has been unexpectedly found to provide improved comfort that reduces muscle strain and improves shoulder and lower neck support.

The split in the seatback 16 is maintained in any of the upright and reclined seatback positions, as well as the folded, stowed seatback position, for optimized comfort in all use positions for occupants, ranging from the smallest (i.e., 5th percentile female) to the largest (i.e., 95th percentile male). Thus, an improved upper seatback support 26 is provided over traditional upper seatback assemblies that undesirably provide a tilt function at higher heights above the seat H-point, such as those upper seatback assemblies that provide a tiltable head restraint or a relatively high pivot point that does not accommodate occupant sizes at the 50th percentile male and smaller. In accordance with the present disclosure, the seatback split is located at a relative height on the seatback where the majority of occupants need the transition from a lower seatback 56 support to an upper seatback support 26.

Figures 11, 11A:
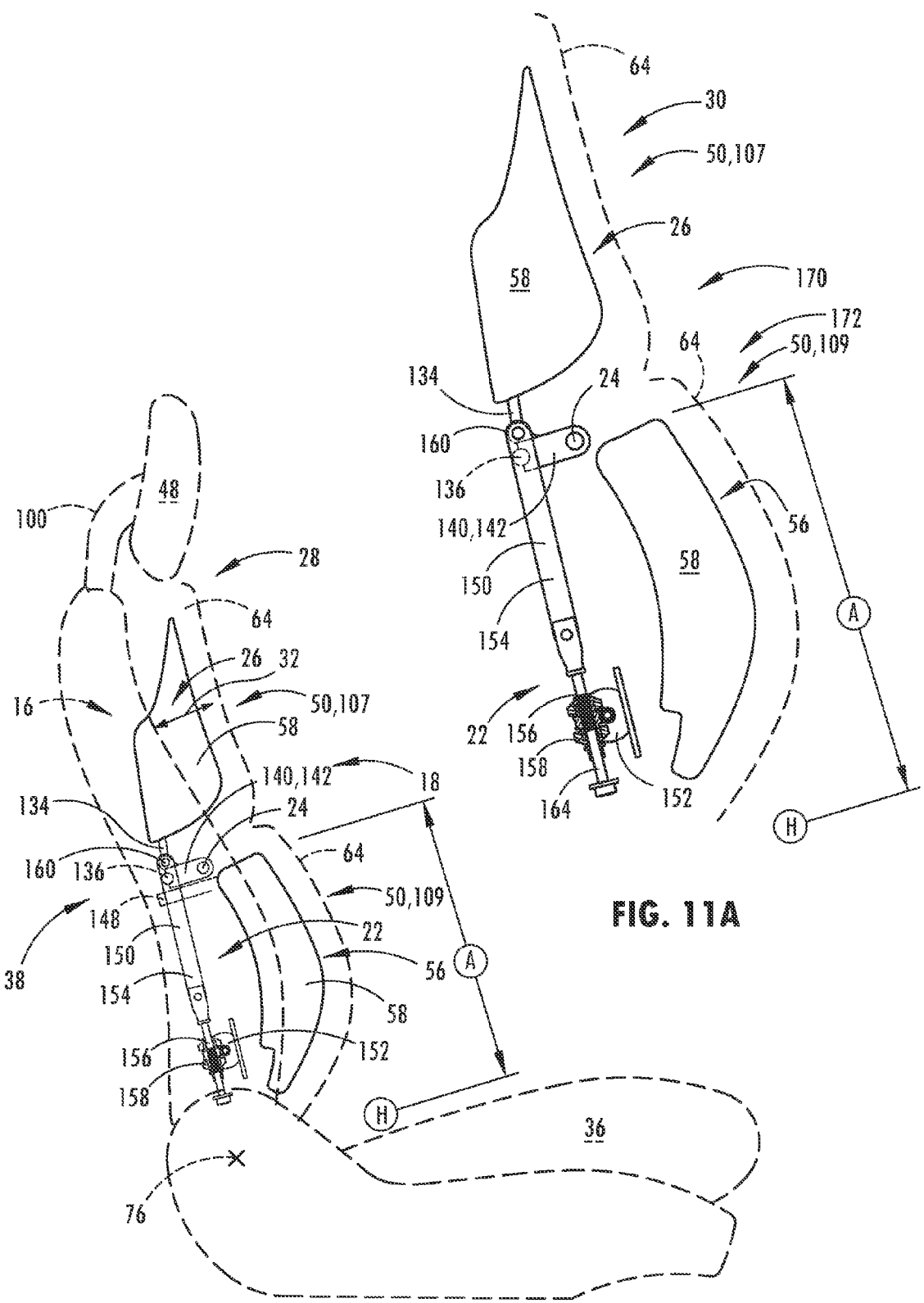
FIG. 11 is a side elevational view of the upper seatback pivot system in the forward position, and the vehicle seating assembly in dashed lines, having the seatback assembly in an upright position.
FIG. 11A is a side elevational view of the upper seatback support, the lower seatback support, and the motorized actuation assembly in the forward position, showing the support surface of the seatback assembly in dashed lines.

As illustrated in FIGS. 11-11A, the seatback structure 16 remains in the upright position, but the upper seatback support 26 is pivoted forward from the rearward position 28 to the forward position 30, shown as a forward position 30, about the pivot bar 24. The pivot bar 24 is rotated to the forward position 30 by the motorized actuation assembly 22 being activated to drive the motor 152 and linearly translate the worm drive 156 upward relative to the motor 152, which moves the lift bar 150 upward relative to the seatback structure 16. The upward movement of the lift bar 150 causes the second cam 142 proximate the lift bar 150 to be raised, pivoting the first and second cams 140, 142 and the support bar 136 forward about the pivot bar 24. The forward rotation of the pivot bar 24, in turn, causes the support bar 136 to rotate the extension bracket 134 and the upper seatback support 26 forward. In the forward position 30, the back support surface 64 of the upper segment 107 of the passenger support 50 is tilted forward to provide increased support to the upper back of a passenger. Also, by raising the upper back support to the forward position 30, the external peripheral gap 32 is increased proximate the upper segment 107 of the passenger support 50.

Figure 12:
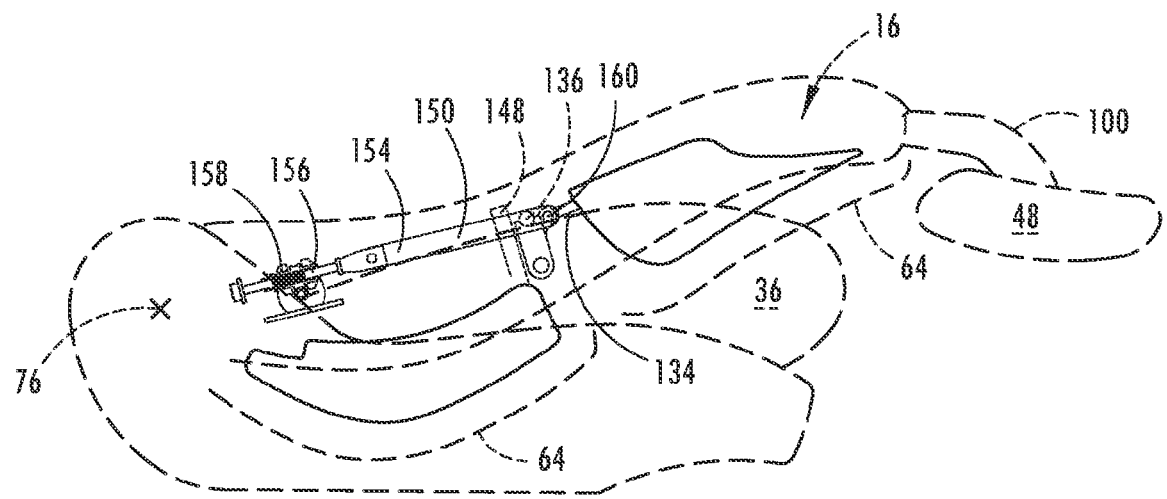
FIG. 12 is a side elevational view of the upper seatback pivot system in the rearward position, and the vehicle seating assembly in dashed lines, having the seatback assembly in a folded, stowed position.
Figure 12A:
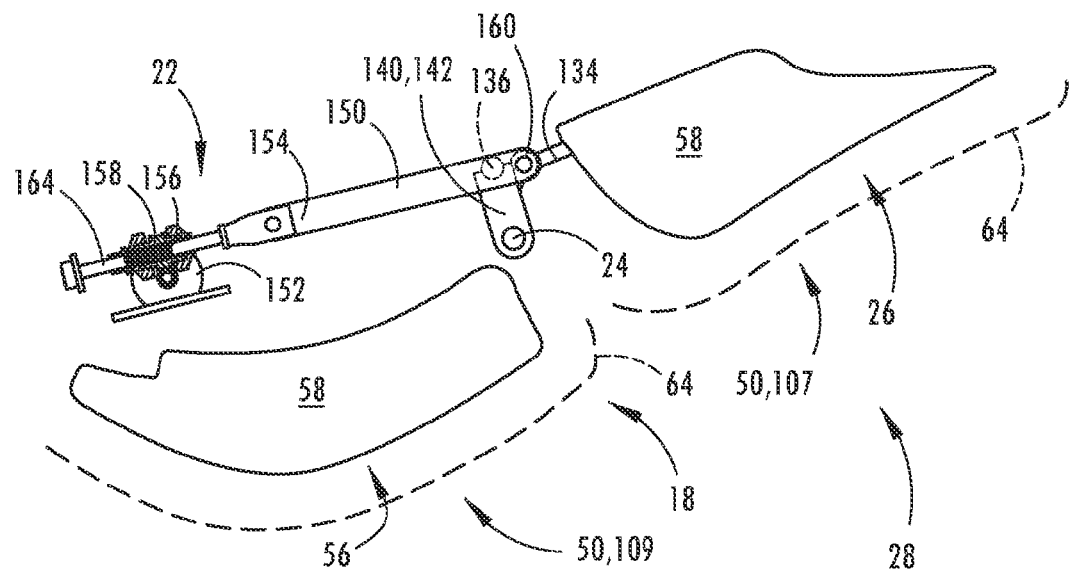
FIG. 12A is a side elevational view of the upper seatback support, the lower seatback support, and the motorized actuation assembly in the rearward position, showing the support surface of the seatback assembly in dashed lines.
Figure 13:
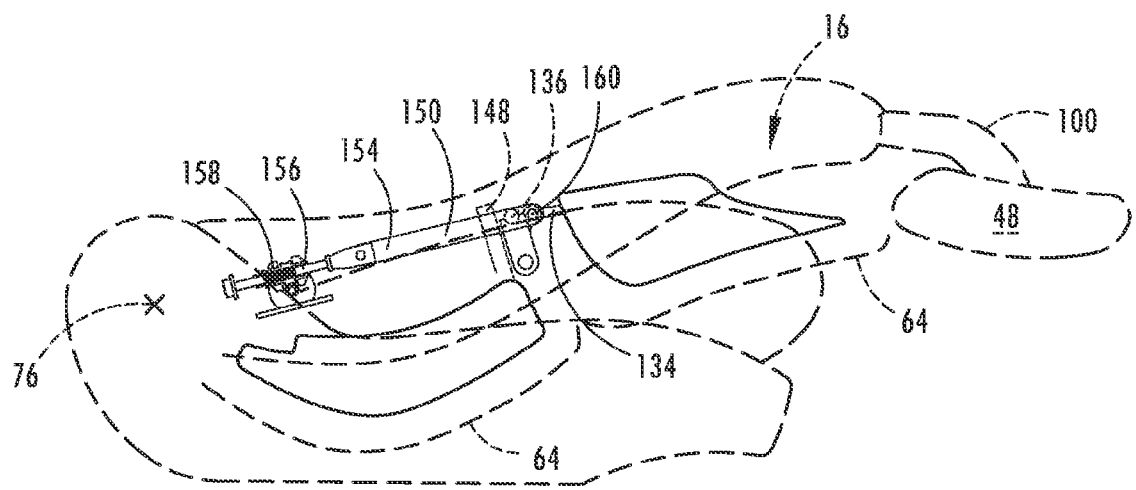
FIG. 13 is a side elevational view of the upper seatback pivot system in the forward position and the vehicle seating assembly in dashed lines, having the seatback assembly in the folded, stowed position.
Figure 13A:
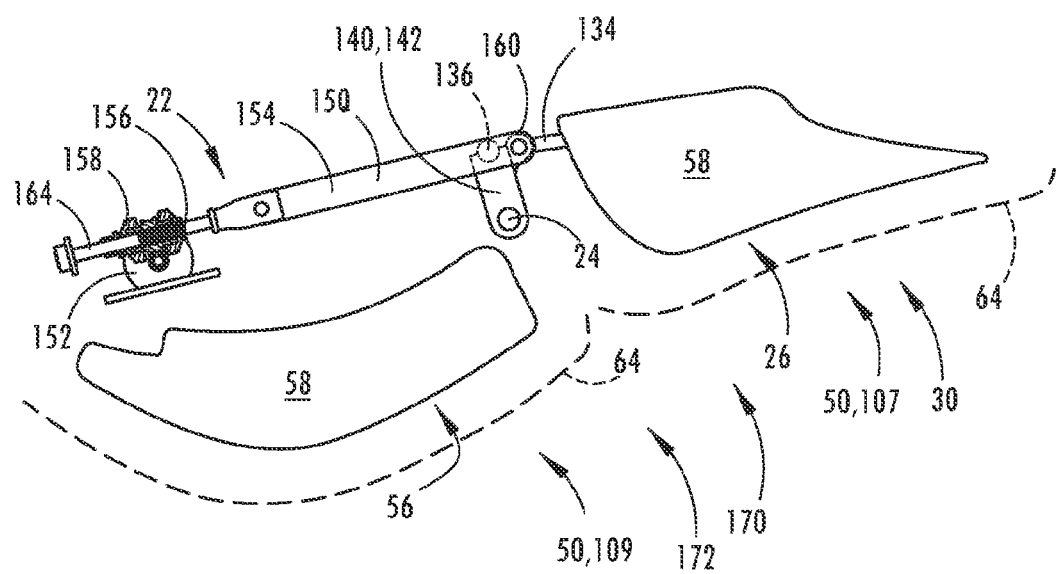
FIG. 13A is a side elevational view of the upper seatback support, the lower seatback support, and the motorized actuation assembly in the forward position, showing the support surface of the seatback assembly in dashed lines.

In addition, the seatback structure 16 of the seatback assembly 38, as shown in FIGS. 12 and 13, may be moved to the stowed, folded position relative to the seat 36. The upper seatback support 26 may pivot rearward relative to the pivot bar 24 to the rearward position 28 when the seatback structure 16 is in the stowed, folded position, as shown in FIG. 12. However, the upper seatback support 26 may also pivot forward about the pivot bar 24 in the forward position 30 relative to the seatback structure 16, even in the folded, stowed position 168, as shown in FIG. 13.

The upper seatback support 26 may also rotate forward to intermediate forward positions, regardless of whether the seatback structure 16 is in the upright position, the reclined position, or the stowed, folded position 168. Thus, the upper seatback support 26 may be actuated independently of the position of the seatback structure 16 relative to the seat 36, such that the upper seatback support 26 may be moved forward and rearward when the seatback structure 16 is in the upright position, the reclined position, or the stowed, folded position. It is also contemplated that the steps may be reversed to move the upper seatback support 26 from the forward position 166, as well as to move the seatback structure 16 from a reclined position to the upright position to the stowed, folded position. Further, it is contemplated that upper seatback support 26 and the seatback structure 16 may be alternately oriented, including being translated beyond the positions illustrated, in both the forward and rearward directions.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly, comprising:
   a lower seat support and a seatback structure extending upwardly relative the lower seat support, the lower seat support and the seatback structure defining a seat H-point at a reclining axis of a connection between the seatback structure and the lower seat support and the seatback structure having an upper seatback support, a lower seatback support, and a split between the upper seatback support and the lower seatback support, wherein the split generally defining a laterally extending line that is disposed between 270 and 300 mm above the H-point;
   a pivot rotatably supported on the seatback structure proximate and substantially parallel to the splint, the pivot rotatably coupled to the upper seatback support, whereby the upper seatback support pivots about the pivot between a rearward position and a forward position relative the lower seatback support; and
   a motorized actuation assembly disposed within the seatback structure and operably coupled to the upper seatback support, wherein the motorized actuation assembly pivots the upper seatback support about the pivot between the rearward position and the forward position.

2. The vehicle seating assembly of claim 1, wherein the split is disposed at substantially 285 mm above the H-point along a line extending parallel to the seatback structure.

3. The vehicle seating assembly of claim 1, wherein the pivot comprises a pivot bar rotatably coupled with the seatback structure and fixedly coupled with the upper seatback support.

4. The vehicle seating assembly of claim 3, wherein the motorized actuation assembly includes a lift bar operably coupled to a cam that is operably coupled to the pivot bar.

5. The vehicle seating assembly of claim 4, further comprising:
   a support bar fixedly coupled to the upper seatback support and the cam, the support bar configured to rotate about the pivot bar as the pivot bar pivots between the rearward position and the forward position.

6. The vehicle seating assembly of claim 5, wherein the lift bar includes a worm drive that interfaces with a worm gear operably coupled with a motor.

7. The vehicle seating assembly of claim 1, wherein the lower seatback support is operably coupled to the seatback structure and maintains alignment with the seatback structure as the seatback structure moves between an upright position and a reclined position.

8. A vehicle seating assembly, comprising:
   a seat and a seatback structure defining an H-point at a reclining axis of a connection between the seatback structure and the seat;
   an upper seatback support having a lower edge generally defining a laterally extending line disposed between 270 and 300 mm above the H-point, wherein the upper seatback support pivots about a pivot generally defining a pivot axis that is proximate and substantially parallel to the laterally extending line, wherein the upper seatback pivots between a rearward position and a forward position relative the seatback structure; and
   a motorized actuation assembly coupled with and controlling the position of the upper seatback support.

9. The vehicle seating assembly of claim 8, wherein the lower edge of the upper seatback support is disposed at substantially 285 mm above the H-point along the laterally extending line and extending generally parallel to the seatback structure.

10. The vehicle seating assembly of claim 8, further comprising a lower seatback support attached to the seatback structure and having an upper edge disposed below the lower edge of the upper seatback support.

11. The vehicle seating assembly of claim 10, wherein the lower edge of the upper seatback support and the upper edge of the lower seatback support define a split between the upper seatback support and the lower seatback support, wherein the split is disposed between 270 and 300 mm above the H-point along the line and extends substantially parallel to the seatback structure.

12. The vehicle seating assembly of claim 8, wherein the seatback further comprises a pivot bar rotatably coupled with seatback and fixedly coupled with the upper seatback support.

13. The vehicle seating assembly of claim 12, wherein the motorized actuation assembly includes a lift bar operably coupled to a cam that is operably coupled to the pivot bar.

14. The vehicle seating assembly of claim 13, wherein the motorized actuation assembly includes a motor operably coupled with a lift bar that is operably coupled with the cam.

15. The vehicle seating assembly of claim 14, wherein a support bar is fixedly coupled to the cam and a body of the upper seatback support, the support bar configured to rotate about the pivot bar as the pivot bar translates the upper seatback support to the forward position.

16. The vehicle seating assembly of claim 12, wherein the pivot bar is disposed between 270 and 300 mm above the H-point along the line and extends substantially parallel to the seatback structure.

17. The vehicle seating assembly of claim 12, wherein the pivot bar is disposed at substantially 285 mm above the H-point along the line and extends substantially parallel to the seatback structure.

18. The vehicle seating assembly of claim 8, wherein an external peripheral gap is defined between the upper seatback support and the seatback structure with the upper seatback support in the forward position.

* * * * *

UNITED STATES PATENT AND TRADEMARK OFFICE
CERTIFICATE OF CORRECTION

PATENT NO. : 9,809,131 B2  
APPLICATION NO. : 14/959060  
DATED : November 7, 2017  
INVENTOR(S) : Line et al.

Page 1 of 1

It is certified that error appears in the above-identified patent and that said Letters Patent is hereby corrected as shown below:

In the Claims

Column 10:  
Claim 1, Line 7;  
"splint" should be --split--.

Column 11:  
Claim 12, Lines 6-7;  
"wherein the seatback further comprises" should be --further comprising--.  
Claim 12, Line 8;  
"seatback" should be --the seatback structure--.

Signed and Sealed this  
Thirtieth Day of January, 2018

Joseph Matal  
*Performing the Functions and Duties of the*  
*Under Secretary of Commerce for Intellectual Property and*  
*Director of the United States Patent and Trademark Office*